(12) United States Patent
Schultz et al.

(10) Patent No.: US 9,942,813 B2
(45) Date of Patent: Apr. 10, 2018

(54) COORDINATING INTER-SATELLITE HANDOFF IN A TELECOMMUNICATIONS SYSTEM

(71) Applicant: THE BOEING COMPANY, Chicago, IL (US)

(72) Inventors: John W. Schultz, Kirkland, WA (US); Todd E. Carter, High Point, NC (US); Ricky L. Jones, Mill Creek, WA (US); Robert S. Barr, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/187,612

(22) Filed: Jun. 20, 2016

(65) Prior Publication Data
US 2017/0367019 A1    Dec. 21, 2017

(51) Int. Cl.
*H04B 7/185*    (2006.01)
*H04W 36/08*    (2009.01)
(Continued)

(52) U.S. Cl.
CPC ......... *H04W 36/08* (2013.01); *H04B 17/318* (2015.01); *H04W 36/30* (2013.01);
(Continued)

(58) Field of Classification Search
CPC ..... H04W 36/08; H04W 36/30; H04W 84/06; H04W 16/28; H04B 17/318; H04B 7/185; H04B 7/18541; H04B 7/2041
See application file for complete search history.

(56) References Cited

U.S. PATENT DOCUMENTS 6,246,874 B1 * 6/2001 Voce ............... H04B 7/18541
455/13.1
8,688,101 B1    4/2014 Hayes et al.
(Continued)

FOREIGN PATENT DOCUMENTS

FR    2 796 229 A1    1/2001
GB    2 305 578 A    4/1997
GB    2 318 947 A    5/1998

OTHER PUBLICATIONS

Extended European Search Report dated Nov. 13, 2017 in European Application No. 17174100.2.

*Primary Examiner* — Barry Taylor
(74) *Attorney, Agent, or Firm* — Womble Bond Dickinson (US) LLP (57) ABSTRACT

A system is provided for coordinating inter-satellite handoff in a telecommunications system that includes first and second communication satellites and a communications apparatus. The communications apparatus is configured to generate commands for transmission to the first communication satellite and the second communication satellite to steer respectively first and second spot beams to track and communicate with a user terminal during respective time intervals. The communication interface is also configured to determine a trajectory of the user terminal and a predicted handoff point on the trajectory for handoff between the satellites in which the second spot beam is automatically steered to the handoff point or a point proximate thereto no sooner than the user terminal is within the second spot beam when steered to the predicted handoff point.

21 Claims, 5 Drawing Sheets

(51) Int. Cl.
*H04W 36/30* (2009.01)
*H04B 17/318* (2015.01)
*H04W 84/06* (2009.01)
*H04W 16/28* (2009.01)
*H04B 7/204* (2006.01)

(52) U.S. Cl.
CPC .......... *H04B 7/185* (2013.01); *H04B 7/18541* (2013.01); *H04B 7/2041* (2013.01); *H04W 16/28* (2013.01); *H04W 84/06* (2013.01)

(56) References Cited

U.S. PATENT DOCUMENTS

| | | | |
|---|---|---|---|
| 8,712,321 B1* | 4/2014 | Dankberg | H04B 7/18513 370/316 |
| 2012/0281672 A1* | 11/2012 | Ohm | H04B 7/185 370/331 |
| 2015/0365870 A1 | 12/2015 | Lauer | |

* cited by examiner

COORDINATING INTER-SATELLITE HANDOFF IN A TELECOMMUNICATIONS SYSTEM

TECHNOLOGICAL FIELD

The present disclosure relates generally to telecommunications systems and, in particular, to coordinating automated inter-satellite handoff within a telecommunications system.

BACKGROUND

Wireless communication has become increasingly available to users on board mobile platforms such as land vehicles, aircraft, spacecraft, watercraft or the like. These wireless communication platforms support remote, hard to access, or mobile user terminals (e.g., vehicular terminals). In particular, these wireless communication platforms often use communication satellites that can provide service coverage over large geographic footprints such as those including remote land-based or water-based regions. Generally, base stations (e.g., ground base stations) send information (e.g., data) to the user terminals through a bent pipe via one or more satellites. More specifically, the base stations send information on a forward link to the satellite in which the satellite receives, amplifies and re-transmits the information to an antenna of one or more fixed or mobile user terminals. The user terminals, in turn, can send data back to the base stations via the satellite. The base stations can provide the user terminals with links to the Internet, public switched telephone networks, and/or other public or private networks, servers and services.

Satellites with steerable High Capacity Payloads (HCP) may be utilized to provide satellite coverage over a geographic region. In some instances, the steerable spot beams of the satellites are prioritized for use by user terminals carrying a high-value passenger such as the president of the United States. This may involve a spot beam being prematurely steered to a handoff point to anticipate receiving handoff from another satellite covering the user terminal. During this time, the communication satellite may idly wait at the handoff point such that the spot beam are otherwise unavailable to other lesser priority vehicles, and the resources of the communication satellite are wasted during the time frame.

Therefore, it may be desirable to have a system and method that take into account at least some of the issues discussed above (e.g., satellite prioritization, location, throughput, and the like), as well as possibly other issues.

BRIEF SUMMARY

Example implementations of the present disclosure are directed to an improved system, apparatus and method for coordinating inter-satellite handoff in a telecommunications system. In particular, the system may execute trajectory calculations for steering a spot beam of a communication satellite to a predicted handoff point or a point proximate thereto no sooner than a high-priority vehicle is within the spot beam, and as a result allowing the satellite to be available for communication with other vehicles while not being utilized or otherwise needed by the high-priority vehicle.

In some example implementations, a method is provided for coordinating inter-satellite handoff in a telecommunications system that includes a first communication satellite and a second communication satellite controllable to lay down steerable spot beams including respectively a first spot beam and a second spot beam. The method may comprise controlling the first communication satellite to steer the first spot beam to track and communicate with a user terminal during a first time interval. The method may also comprise determining a trajectory of the user terminal and a predicted handoff point on the trajectory for the handoff of the user terminal from the first communication satellite to the second communication satellite.

The method may also comprise automatically controlling the second communication satellite to steer the second spot beam to the predicted handoff point or a point proximate thereto no sooner than the user terminal is within the second spot beam when steered to the predicted handoff point or the point proximate thereto to enable the handoff. Thereafter, the method may comprise coordinating handoff of the user terminal from the first communication satellite to the second communication satellite, and controlling the second communication satellite to steer the second spot beam to track and communicate with the user terminal during a subsequent, second time interval.

In some example implementations of the method of the preceding or any subsequent example implementation, or any combination thereof, controlling the second communication satellite includes securely transmitting the predicted handoff point to the second communication satellite via a communication interface.

In some example implementations of the method of any preceding or any subsequent example implementation, or any combination thereof, automatically controlling the second communication satellite includes automatically controlling the second communication satellite to steer the second spot beam to the point proximate the predicted handoff point in which the point is between the predicted handoff point and another user terminal with which the second communication satellite is in communication during the first time interval. The predicted handoff point and the other user terminal are within the second spot beam when steered to the point proximate the predicted handoff point and allows the second steerable beam to provide beyond Line of sight communications service to multiple platforms.

In some example implementations of the method of any preceding or any subsequent example implementation, or any combination thereof, the user terminal is a vehicular terminal of a land vehicle, aircraft, spacecraft or watercraft having a higher priority than the other user terminal based on the vehicular terminal having a designated passenger, and based thereon, the point proximate the predicted handoff point is closer to the predicted handoff point than the other user terminal.

In some example implementations of the method of any preceding or any subsequent example implementation, or any combination thereof, automatically controlling the second communication satellite includes automatically controlling the second communication satellite to steer the second spot beam to the predicted handoff point, and the method further comprises controlling the second communication satellite to terminate communication with another user terminal with which the second communication satellite is in communication during the first time interval, in an instance in which the other user terminal is outside the second spot beam when steered to the predicted handoff point.

In some example implementations of the method of any preceding or any subsequent example implementation, or any combination thereof, in an instance in which a plurality of user terminals excluding the user terminal are within the first spot beam during the second time interval, the method further comprises controlling the first communication satellite to center the first spot beam between at least some of the plurality of user terminals.

In some example implementations of the method of any preceding or any subsequent example implementation, or any combination thereof, in an instance in which a plurality of user terminals excluding the user terminal are within the second spot beam during the first time interval, the method further comprises controlling the second communication satellite to center the second spot beam between at least some of the plurality of user terminals.

In some example implementations, an apparatus is provided for coordinating inter-satellite handoff in a telecommunications system. The apparatus comprises a processor and a memory storing executable instructions that, in response to execution by the processor, cause the apparatus to implement a number of subsystems, such as a first communication satellite, second communication satellite and communications apparatus that may be configured to at least perform the method of any preceding example implementation, or any combination thereof.

In some example implementations, a computer-readable storage medium is provided for coordinating inter-satellite handoff in a telecommunications system. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to satellite telecommunications systems and, in particular, to coordinating automated inter-satellite handoff within a telecommunications system. In particular, the example implementations of the present disclosure describe a system that executes trajectory calculations for coordinating an automated handoff between two communication satellites by steering a spot beam of a second communication satellite to a predicted handoff point or a point proximate thereto no sooner than a high-priority vehicle is within the spot beam. As a result, the system enables the satellite to be available for communication with other vehicles while not being utilized or otherwise needed by the high-priority vehicle and thereby provides for optimal utilization of satellite resources.

As described herein, the term "satellite" may be used without loss of generality and include other types of relay and distribution apparatuses, which in various examples may be located on land or onboard a mobile platform (e.g., land vehicle, aircraft, spacecraft, watercraft). Thus, although the system of example implementations may be shown and described as including one or more "satellites," the term may be used more broadly to include one or more relay and distribution apparatuses.

Figure 1A:
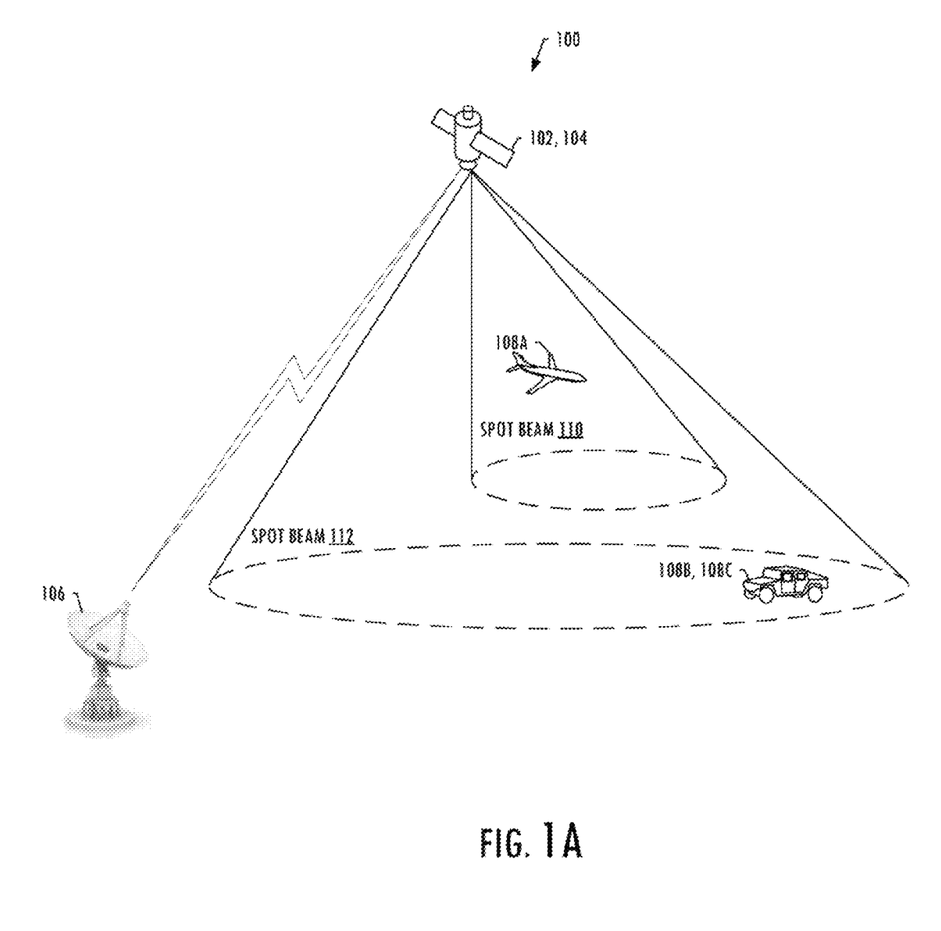
FIGS. 1A and 1B illustrate a satellite telecommunications system, according to example implementations of the present disclosure.
Figure 1B:
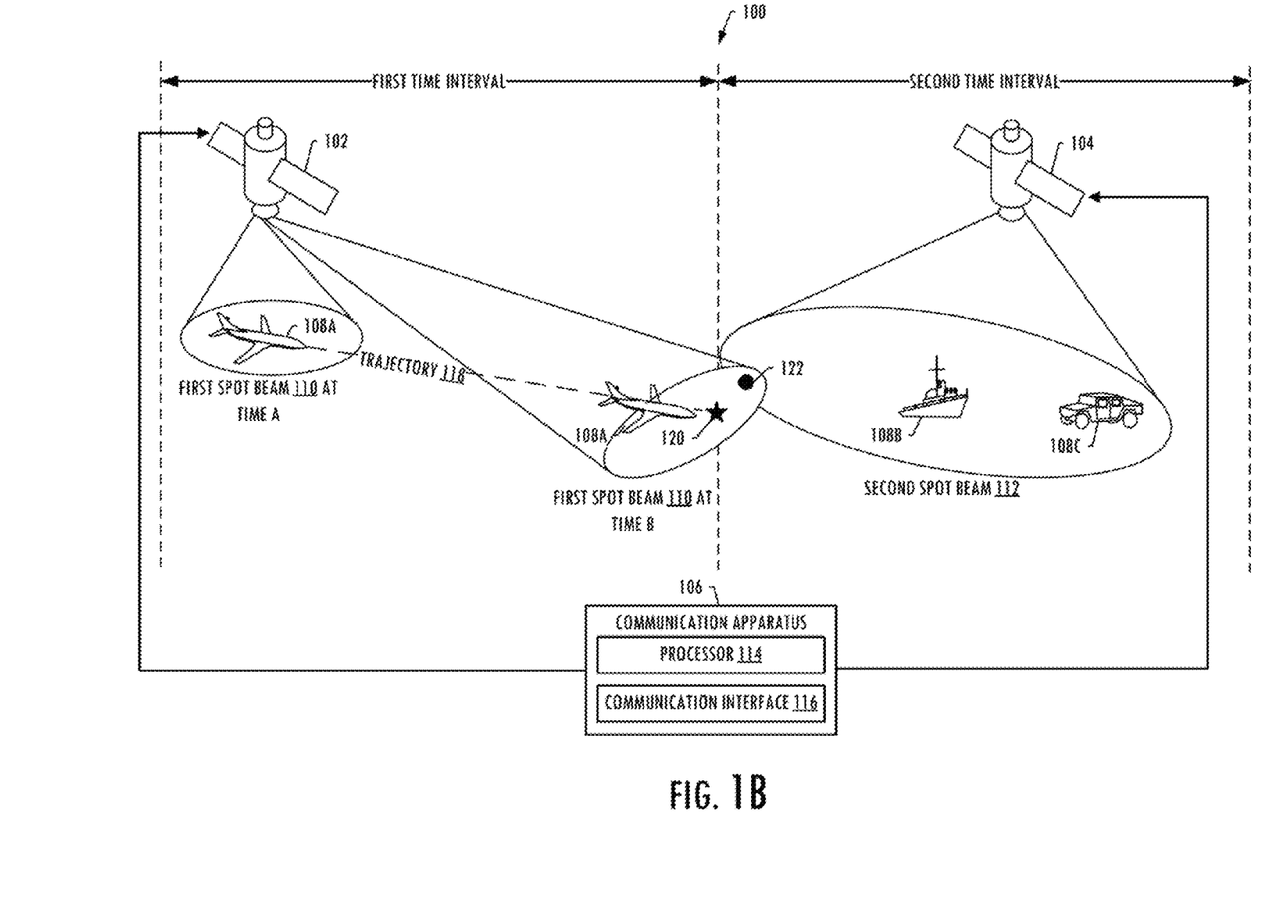

FIGS. 1A and 1B illustrate a system 100 for coordinating inter-satellite handoff in a telecommunications system, which may be simply referred to as the "system" herein. The system may be configured to perform a number of different functions or operations, either automatically, under direct operator control, or some combination of thereof. In this regard, the system may be configured to perform one or more of its functions or operations automatically, that is, without being directly controlled by an operator. Additionally or alternatively, the system may be configured to perform one or more of its functions or operations under direct operator control.

In accordance with example implementations of the present disclosure, the system 100 is configured to perform various functions or operations to coordinate inter-satellite handoff in a telecommunications system. The system is configured to generate commands for transmission to communication satellites 102, 104 to steer spot beams to track and communicate with a user terminal 108A during respective time intervals. In which a first communication satellite 102 initially tracks and communicates with the user terminal and a second communication satellite 104 tracks and communicates with the user terminal after handoff of the user terminal from the first communication satellite. The commands may be generated from a communication apparatus 106 within a satellite ground base station, for example.

The system 100 may automatically generate a command for transmission to the first communication satellite 102 to steer a spot beam 110 to track and communicate with the user terminal 108A during a first time interval. Also during the first time interval, the system may determine a trajectory of the user terminal and a predicted handoff point on the trajectory for the handoff. The system may then automatically generate a command for transmission to the second communication satellite 104 to steer a second spot beam 112 to the predicted handoff point or a point proximate thereto no sooner than the user terminal is within the second spot beam when steered to the predicted handoff point. It should be noted that FIG. 1A provides a high-level depiction of the system in which the satellite is representative of at least two separate and distinct satellites that lay down respective spot beams, and the additional user terminals 108B, 108C represent at least two user terminals, as more particularly illustrated in FIG. 1B.

The system 100 may include one or more of each of a number of different subsystems (each an individual system) coupled to one another for performing one or more functions or operations. As more particularly shown in FIG. 1B, in some examples, the system includes a first communication satellite 102, a second communication satellite 104, and a communications apparatus 106 to control the first and second communication satellites in communication with one or more user terminals 108. The user terminals may be of a variety of different types such as large-sized aeronautical and maritime terminals, mid-sized portable and vehicular terminals, and/or small-sized handheld terminals. For example, a user terminal may include a vehicular terminal of a land vehicle, aircraft, spacecraft or watercraft. It should be understood that one or more of the subsystems may function or operate as a separate system without regard to others of the subsystems. And further, it should be understood that the system may include one or more additional or alternative subsystems than those shown in FIGS. 1A and 1B.

As shown in FIG. 1B, in some examples, the first communication satellite 102 and the second communication satellite 104 are controllable to lay down steerable spot beams including respectively a first spot beam 110 and a second spot beam 112. The steerable spot beams may be configured to serve geographic regions anywhere on the earth (e.g., Indian Ocean region, Pacific Ocean region, Atlantic Ocean region), and may collectively provide global coverage.

The communication satellites 102, 104 may be configured to communicate with the communications apparatus 106 to provide coverage for user terminal communication while within the spot beam. As such the spot beams may have corresponding coverage regions or areas in which the one or more user terminals 108 may be located. In some examples, the communication satellites include a satellite with a plurality of High Capacity Payload (HCP) steerable spot beam antennas for sending and receiving signals within a high capacity frequency band (e.g., Ka-Band) such as an Inmarsat-5 series satellite. For example, a suitable communication satellite may comprise two antennas for supporting gateway connectivity (e.g., connectivity with the communications apparatus), and six remaining antennas configured to support High Capacity Military (HCM) and/or High Capacity Commercial (HCC) operations. Each steerable spot beam antenna may be securely and independently pointed to accommodate channels assigned to HCM and HCC applications simultaneously. In some examples, the communications apparatus may be configured to communicate with other satellites (e.g., Inmarsat-4 series satellites) for sending and receiving information such as positional data of the user terminals.

The telecommunications system may encompass one or more networks such as a communications satellite network (that includes the first and second communication satellites 102, 104), the Internet, public switched telephone networks (PSTN), packet data networks (PDN), public land mobile networks (PLMN), private networks such as corporate and government networks, and/or other servers and services. The communications apparatus 106 may be coupled to or otherwise part of one or more networks of the telecommunications system. In some examples, the communications apparatus may be operated by a satellite ground base station. In some of these examples, the base station may be government operated, and the communications apparatus may be or include an air to ground gateway that functions as a government entry point for mobile platform data flowing into the Government Information Grid (GIG). In other examples, the base station may additionally or alternatively include a hosted mission operations center.

The communications apparatus 106 may include a processor 114 coupled to a communication interface 116 to enable communication with the first and second communication satellites 102, 104. In various examples, the communication satellites and communications apparatus enable communication between user terminals 108 and the telecommunications system. In this regard, the communications apparatus may receive information (e.g., data) from the telecommunications system, and communicate the information to the satellites. The satellites may in turn transmit or relay the information to one or more user terminals in spot beams (e.g., spot beams 110, 112). Conversely, for example, the satellites may receive information from a user terminal, and communicate the information to the communications apparatus, which may in turn transmit or relay the information to the network. This type of communication may at times be referred to as "bent-pipe" communication. It should be understood, however, that example implementations may also be applicable to other types of satellite systems, such as those with on-board packet switching.

The processor 114 of the communications apparatus 106 may be configured to generate commands for transmission to the first and second communication satellites 102, 104 to steer respectively the first and second spot beams 110, 112 to track and communicate with a user terminal 108A. In particular the first and second spot beams may track and communicate with the user terminal during respectively a first time interval, and a subsequent, second time interval after handoff of the user terminal from the first communication satellite to the second communication satellite. As shown, the coverage area of a spot beam may with automatically recalculated within a time interval (e.g., at Time A and Time B) based on the position of the user terminal.

In some examples, the processor 114 is therefore be configured to determine a trajectory 118 of the user terminal 108A and a predicted handoff point 120 on the trajectory for the handoff from the first communication satellite 102 to the second communication satellite 104. In some examples, the trajectory may be determined based on positional data from a communication satellite other than the first and second communication satellites 102, 104. The processor is configured to then automatically generate a command for transmission, via the communication interface 116, to the second communication satellite to steer the second spot beam 112 to the predicted handoff point or a point 122 proximate thereto. In some examples, the communication interface 116 may be configured to securely transmit the command including the predicted handoff point. For example, the communication interface may be configured to transmit the command over a secure channel or using a suitable secured wireless transmission or cryptographic protocol.

This command may be to more particularly steer the second spot beam 112 to the predicted handoff point 120 or the point 122 proximate thereto no sooner than the user terminal 108A is within the second spot beam when steered to the predicted handoff point. For example, the spot beam may be steered to the predicted handoff point within seconds of the user terminal's anticipated arrival at the predicted handoff point. In these examples, by steering the spot beam to a location near to, or proximate, the predicted handoff point just in time or no sooner than the user terminal is within the second spot beam, the second communication satellite 104 may serve other user terminals before needed for handoff of the user terminal.

For example, the second steerable spot beam 112 may be considered near to, or proximate the handoff point 120 just in time, in instances in which the spot beam is steered to the predicted handoff point or the point 122 proximate thereto within approximately one to five seconds of, or at approximately the same instance in time at which the user terminal has been projected to enter (e.g., projected based on the determined trajectory) or will enter the coverage region of the spot beam at the predicted handoff point or the point proximate thereto. This "just in time" value may vary depending on the speed of the user terminal (e.g., an aircraft, bus, car, train, and the like) and the trajectory of the user terminal into or out of a central region of a particular spot beam. In another example, a steerable spot beam may be considered near to, or proximate the handoff point no sooner than the user terminal, in instances in which the user terminal has entered the coverage region of the spot beam, or will enter the coverage region within approximately five to ten seconds of the spot beam being steered to the predicted handoff point or the point proximate thereto.

In some instances in which the second communication satellite 104 is in communication with another user terminal 108B during the first time interval, the command may be to steer the second spot beam 112 to the point 122 proximate the predicted handoff 120. The point may be between the predicated handoff point and the other user terminal. The predicted handoff point and the other user terminal may be within the second spot beam when steered to the point, which may enable both handoff of the user terminal and continued communication with the other user terminal.

In some of these instances, the user terminal 108A is a vehicular terminal of a land vehicle, aircraft, spacecraft or watercraft having a higher priority than other user terminals 108B, 108C based on the vehicular terminal having a designated passenger (e.g., the President of the United States (POTUS). In particular, the designated passenger may have a guaranteed priority for tracking over other user terminals within the second spot beam. Based thereon, the point 122 proximate the predicted handoff point 120 is closer to the predicted handoff point than the other user terminal.

Figure 2:
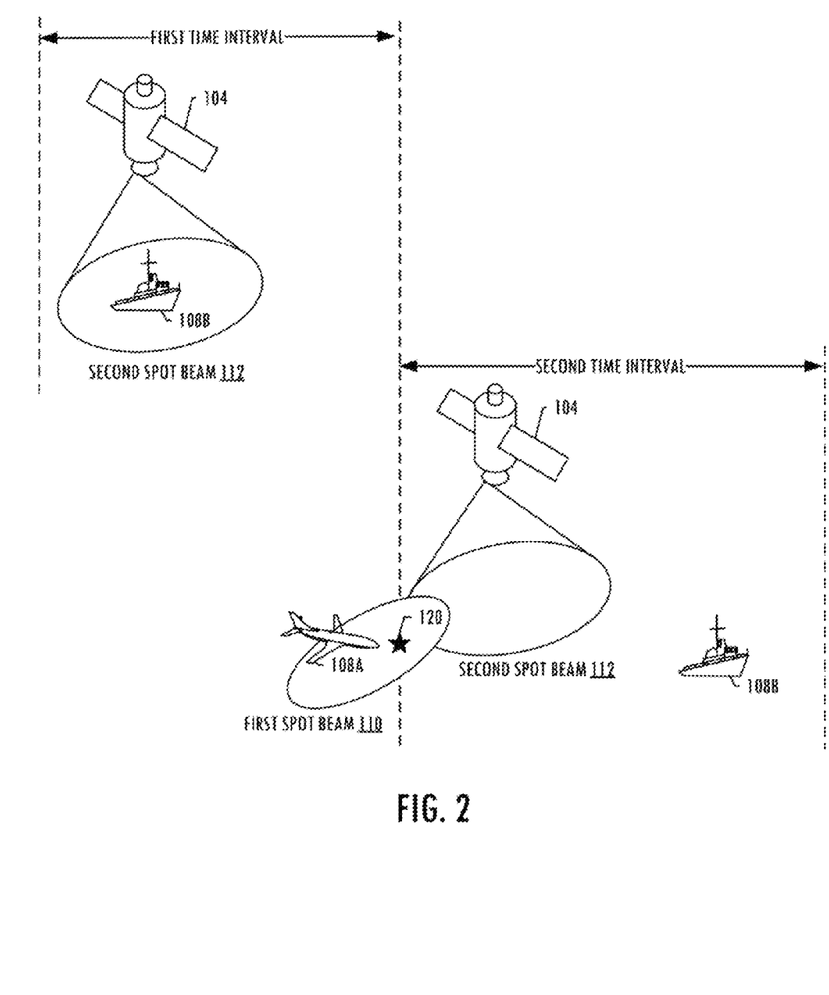
FIGS. 2 more particularly illustrate components of the satellite telecommunications system of FIGS. 1A and 1B, according to example implementations of the present disclosure.

As shown in FIG. 2, in some instances the second communication satellite 104 is also in communication with another user terminal 108B during the first time interval. In these instances, after the second spot beam 112 is steered to the predicted handoff point 120 by the second communication satellite 104, the processor 114 may be configured to generate and transmit a command to the second communication satellite to terminate communication with the other user terminal in an instance in which the other user terminal is outside the second spot beam when steered to the predicted handoff point. In some examples, the processor may be further configured to generate and transmit a notification of the terminated communication to the user terminal prior to, or at the same instance in time of the disconnection. Accordingly, the other user terminal is not otherwise uninformed about the terminated service by the second communication satellite due to the spot beam being utilized by a higher priority user terminal 108A.

In some examples a plurality of user terminals 108A, 108B, 108C are within a respective spot beam (e.g., first and spot beams 110, 112) while the spot beam is not otherwise being utilized the higher priority user terminal 108A or being steered proximate thereto. In these examples, the processor 114 may be configured to generate and transmit a command to the appropriate satellite (e.g., the first or second communication satellite 102, 104) to center the respective spot beam between at least some of the plurality of user terminals. As a result, the plurality of user terminals are maintained within the coverage region of the respective spot beam. Upon, being steered to the predicted handoff point 120, the spot beam may instead track the point proximate the user higher priority user terminal which in some instances may displace the plurality of user terminals outside of the spot beam.

Figure 3:
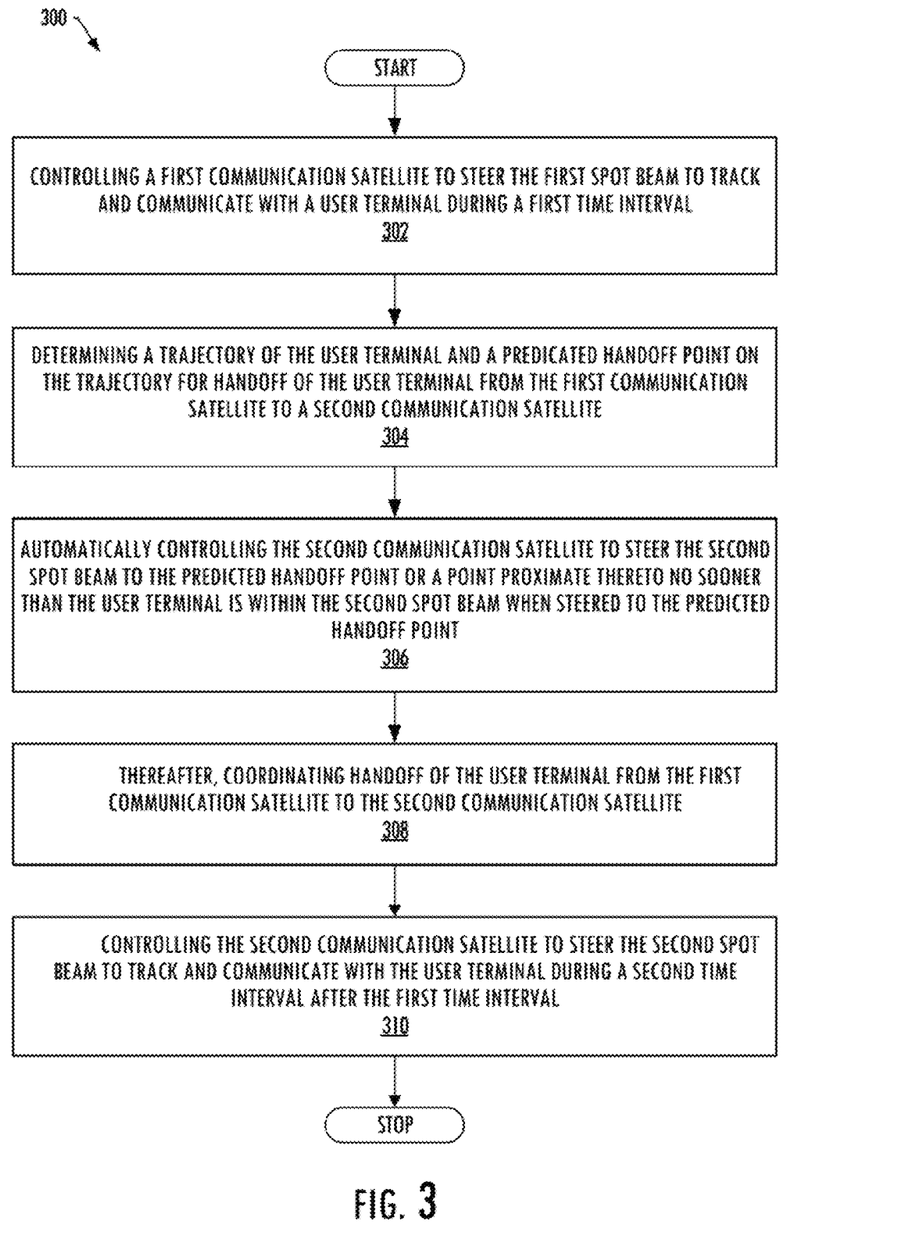
FIGS. 3 illustrates various operations of a method for coordinating inter-satellite handoff in a telecommunications system, in accordance with an example implementation.

FIG. 3 illustrates a flowchart including various operations of a method 300 for coordinating inter-satellite handoff in a telecommunications system including a first communication satellite 102 and a second communication satellite 104 that are controllable to lay down steerable spot beams including respectively a first spot beam 110 and a second spot beam 112. As shown at block 302, the method may comprise at a communications apparatus 106, controlling the first communication satellite to steer the first spot beam to track and communicate with a user terminal 108A during a first time interval. The method may also comprise determining a trajectory 118 of the user terminal and a predicted handoff point 120 on the trajectory for handoff of the user terminal from the first communication satellite to the second communication satellite, as shown at block 304.

The method 300 may also comprise, at the communications apparatus, automatically controlling the second communication satellite 104 to steer the second spot beam 112 to the predicted handoff point 120 or a point 122 proximate thereto no sooner than the user terminal is within the second spot beam when steered to the predicted handoff point, as shown at block 306. Thereafter, the method may also comprise coordinating handoff of the user terminal from the first communication satellite to the second communication satellite, and controlling the second communication satellite to steer the second spot beam to track and communicate with the user terminal 108A during a second time interval after the first time interval, as shown at blocks 308, 310 respectively.

According to example implementations of the present disclosure, the system 100 and its subsystems and/or components including the first communication satellite 102, second communication satellite 104, and communications apparatus 106 may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 4:
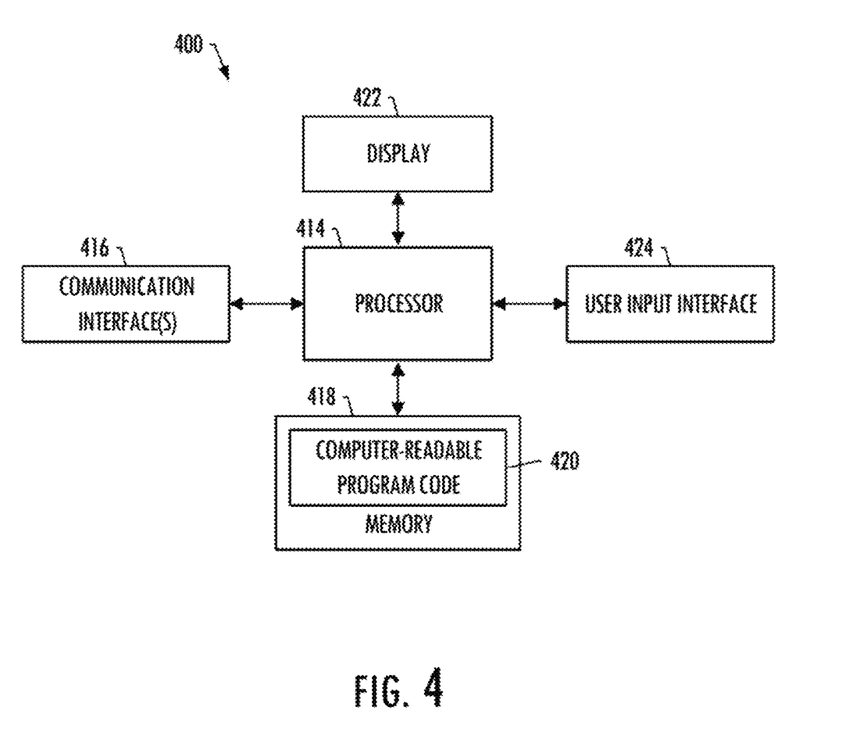
FIG. 4 illustrates an apparatus according to some example implementations.

FIG. 4 illustrates an apparatus 400 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 414 (e.g., processor unit) connected to a memory 418 (e.g., storage device).

The processor 414 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 420 (of the same or another apparatus).

The processor 414 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 420 is generally any piece of computer hardware that is capable of storing information such as, for example, data, computer programs (e.g., computer-readable program code 420) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface 416 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 422 and/or one or more user input interfaces 424 (e.g., input/output unit). The display may be configured to present or otherwise display information to a user, suitable examples of which include a liquid crystal display (LCD), light-emitting diode display (LED), plasma display panel (PDP) or the like.

The user input interfaces 424 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 414 and a computer-readable storage medium or memory 420 coupled to the processor, where the processor is configured to execute computer-readable program code 420 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system (100) for coordinating inter-satellite handoff in a telecommunications system, the system including:
    a first communication satellite (102) and a second communication satellite (104) controllable to lay down steerable spot beams including respectively a first spot beam (110) and a second spot beam (112);
    a communications apparatus (106, 400) including a processor (114, 414) coupled to a communication interface (116, 416) to enable the communications apparatus to communicate with the first communication satellite and the second communication satellite, the processor being configured to at least:
        generate commands for transmission, via the communication interface, to the first communication satellite and the second communication satellite to steer respectively the first spot beam and the second spot beam to track and communicate with a user terminal (108A) during respectively a first time interval and a subsequent, second time interval after handoff of the user terminal from the first communication satellite to the second communication satellite, and to coordinate the handoff; and during the first time interval, determine a trajectory (118) of the user terminal and a predicted handoff point (120) on the trajectory for the handoff; and
        automatically generate a command for transmission, via the communication interface, to the second communication satellite to steer the second spot beam to the predicted handoff point or a point (122) proximate thereto no sooner than the user terminal is within the second spot beam when steered to the predicted handoff point or the point proximate thereto to enable the handoff.

2. The system of claim 1, wherein the processor (114, 414) being configured to automatically generate the command for transmission to the second communication satellite (104) includes being configured to automatically generate the command for secure transmission to the second communication satellite, the command including the predicted handoff point (120).

3. The system of claim 1, wherein the processor (114, 414) is configured to automatically generate the command to steer the second spot beam (112) to the point (122) proximate the predicted handoff point (120), which is between the predicted handoff point and another user terminal (108B) with which the second communication satellite (104) is in communication during the first time interval, the predicted handoff point and the other user terminal being within the second spot beam when steered to the point proximate the predicted handoff point.

4. The system of claim 3, wherein the user terminal (108A) is a vehicular terminal of a land vehicle, aircraft, spacecraft or watercraft having a higher priority than the other user terminal (108B) based on the vehicular terminal having a designated passenger, and based thereon, the point (122) proximate the predicted handoff point (120) is closer to the predicted handoff point than the other user terminal.

5. The system of claim 1, wherein the processor (114, 414) is configured to automatically generate the command to steer the second spot beam (112) to the predicted handoff point (120), and
    wherein the processor is further to generate a command for transmission, via the communication interface (116, 416), to the second communication satellite (104) to terminate communication with another user terminal (108B) with which the second communication satellite is in communication during the first time interval, in an instance in which the other user terminal is outside the second spot beam when steered to the predicted handoff point.

6. The system of claim 1, wherein in an instance in which a plurality of user terminals (108B, 108C) excluding the user terminal (108A) are within the first spot beam (110) during the second time interval, the processor (114, 414) is further configured to generate a command for transmission to center the first spot beam between at least some of the plurality of user terminals.

7. The system of claim 1, wherein in an instance in which a plurality of user terminals (108B, 108C) excluding the user terminal (108A) are within the second spot beam (112) during the first time interval, the processor (114, 414) is further configured to generate a command for transmission to center the second spot beam between at least some of the plurality of user terminals.

8. An apparatus (106, 400) for coordinating inter-satellite handoff in a telecommunications system including a first communication satellite (102) and a second communication satellite (104) controllable to lay down steerable spot beams including respectively a first spot beam (110) and a second spot beam (112), the apparatus comprising a processor (114, 414) and a memory (420) storing executable instructions (420) that, in response to execution by the processor, cause the apparatus to at least:

control the first communication satellite to steer the first spot beam to track and communicate with a user terminal (108A) during a first time interval;

determine a trajectory (118) of the user terminal and a predicted handoff point (120) on the trajectory for the handoff for handoff of the user terminal from the first communication satellite to the second communication satellite;

automatically control the second communication satellite to steer the second spot beam to the predicted handoff point or a point (122) proximate thereto no sooner than the user terminal is within the second spot beam when steered to the predicted handoff point or the point proximate thereto to enable the handoff; and thereafter,     coordinate handoff of the user terminal from the first communication satellite to the second communication satellite; and     control the second communication satellite to steer the second spot beam to track and communicate with the user terminal during a subsequent, second time interval.

9. The apparatus (106, 400) of claim 8 further comprising a communication interface (116, 416) to enable communication between the apparatus and at least the second communication satellite (104),     wherein the apparatus (106, 400) being caused to control the second communication satellite includes being caused to securely transmit the predicted handoff point (120) to the second communication satellite via the communication interface.

10. The apparatus (106, 400) of claim 8, wherein the apparatus is caused to automatically control the second communication satellite (104) to steer the second spot beam (112) to the point (122) proximate the predicted handoff point (120), which is between the predicted handoff point and another user terminal (108B) with which the second communication satellite (104) is in communication during the first time interval, the predicted handoff point and the other user terminal being within the second spot beam when steered to the point proximate the predicted handoff point.

11. The apparatus (106, 400) of claim 10, wherein the user terminal (108A) is a vehicular terminal of a land vehicle, aircraft, spacecraft or watercraft having a higher priority than the other user terminal (108B) based on the vehicular terminal having a designated passenger, and based thereon, the point (122) proximate the predicted handoff point (120) is closer to the predicted handoff point than the other user terminal.

12. The apparatus (106, 400) of claim 8, wherein the apparatus is caused to automatically control the second communication satellite (104) to steer the second spot beam (112) to the predicted handoff point (120), and the apparatus stores further executable instructions (420) that, in response to execution by the processor (114, 414), cause the apparatus to at least:

control the second communication satellite to terminate communication with another user terminal (108B) with which the second communication satellite is in communication during the first time interval, in an instance in which the other user terminal is outside the second spot beam when steered to the predicted handoff point.

13. The apparatus (106, 400) of claim 8, wherein in an instance in which a plurality of user terminals (108B, 108C) excluding the user terminal (108A) are within the first spot beam (110) during the second time interval, the apparatus stores further executable instructions (420) that, in response to execution by the processor (114, 414), cause the apparatus to at least center the first spot beam between at least some of the plurality of user terminals.

14. The apparatus (106, 400) of claim 8, wherein in an instance in which a plurality of user terminals (108B, 108C) excluding the user terminal (108A) are within the second spot beam (112) during the first time interval, the apparatus stores further executable instructions (420) that, in response to execution by the processor (114, 414), cause the apparatus to at least center the second spot beam between at least some of the plurality of user terminals.

15. A method (400) for coordinating inter-satellite handoff in a telecommunications system including a first communication satellite (102) and a second communication satellite (104) controllable to lay down steerable spot beams including respectively a first spot beam (110) and a second spot beam (112), the method comprising at a communications apparatus (106, 400):

controlling (402) the first communication satellite to steer the first spot beam to track and communicate with a user terminal (108A) during a first time interval;

determining (404) a trajectory (118) of the user terminal and a predicted handoff point (120) on the trajectory for the handoff for handoff of the user terminal from the first communication satellite to the second communication satellite;

automatically controlling (406) the second communication satellite to steer the second spot beam to the predicted handoff point or a point (122) proximate thereto no sooner than the user terminal is within the second spot beam when steered to the predicted handoff point or the point proximate thereto to enable the handoff; and thereafter,     coordinating (408) handoff of the user terminal from the first communication satellite to the second communication satellite; and     controlling (410) the second communication satellite to steer the second spot beam to track and communicate with the user terminal during a subsequent, second time interval.

16. The method of claim 15, wherein controlling (406) the second communication satellite includes securely transmitting the predicted handoff point (120) to the second communication satellite via a communication interface (116, 416).

17. The method of claim 15, wherein automatically controlling (406) the second communication satellite (104) includes automatically controlling the second communication satellite to steer the second spot beam (112) to the point (122) proximate the predicted handoff point (120), which is between the predicted handoff point and another user terminal (108B) with which the second communication satellite (104) is in communication during the first time interval, the predicted handoff point and the other user terminal being within the second spot beam when steered to the point proximate the predicted handoff point.

18. The method of claim 17, wherein the user terminal (108A) is a vehicular terminal of a land vehicle, aircraft, spacecraft or watercraft having a higher priority than the other user terminal (108B) based on the vehicular terminal having a designated passenger, and based thereon, the point (122) proximate the predicted handoff point (120) is closer to the predicted handoff point than the other user terminal.

19. The method of claim 15, wherein automatically controlling (406) the second communication satellite (104) includes automatically controlling the second communication satellite to steer the second spot beam (112) to the predicted handoff point (120), and the method further comprising:

controlling the second communication satellite to terminate communication with another user terminal (108B) with which the second communication satellite is in communication during the first time interval, in an instance in which the other user terminal is outside the second spot beam when steered to the predicted handoff point.

20. The method of claim 15, wherein in an instance in which a plurality of user terminals (108B, 108C) excluding the user terminal (108A) are within the first spot beam (110) during the second time interval, the method further comprising controlling the first communication satellite to center the first spot beam between at least some of the plurality of user terminals.

21. The method of claim 15, wherein in an instance in which a plurality of user terminals (108B, 108C) excluding the user terminal (108A) are within the second spot beam (112) during the first time interval, the method further comprising controlling the second communication satellite to center the second spot beam between at least some of the plurality of user terminals.

\* \* \* \* \*